US008755056B2

(12) United States Patent
Edwards et al.

(10) Patent No.: US 8,755,056 B2
(45) Date of Patent: *Jun. 17, 2014

(54) DEFAULT MEDIA SELECTION METHODS IN A MULTI-MEDIA PRINTER

(75) Inventors: Richard M Edwards, Copley, OH (US); Alan J Gilbert, Hudson, OH (US); Gary W Keefe, Brecksville, OH (US); Peter O Botten, Lakewood, OH (US)

(73) Assignee: Codonics, Inc., Middleburg Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,738

(22) Filed: Oct. 3, 2011

(65) Prior Publication Data
US 2012/0019840 A1    Jan. 26, 2012

Related U.S. Application Data

(63) Continuation of application No. 10/719,745, filed on Nov. 21, 2003, now Pat. No. 8,031,347.

(60) Provisional application No. 60/428,418, filed on Nov. 22, 2002.

(51) Int. Cl.
*G06F 3/12* (2006.01)
*H04N 1/04* (2006.01)

(52) U.S. Cl.
USPC .......................................... 358/1.1; 358/498

(58) Field of Classification Search
CPC .... G06K 15/16; G06K 15/021; G06F 3/1205; G06F 3/1253; G06F 3/1285; H04N 1/00318; H04N 1/00567; H04N 1/0062; H04N 1/00623; H04N 1/00663
USPC .......... 358/1.1, 1.9, 1.18, 296, 401, 449, 451, 358/1.8, 1.13, 1.15, 424.04, 498; 399/16, 399/388; 347/153, 217; 355/407
See application file for complete search history.

(56) References Cited

U.S. PATENT DOCUMENTS

| 5,019,916 | A | * | 5/1991 | Ogura | 358/401 |
| 5,500,715 | A | * | 3/1996 | Ta et al. | 399/1 |
| 6,559,971 | B1 | * | 5/2003 | Watts et al. | 358/1.2 |
| 7,206,081 | B2 | * | 4/2007 | Sada et al. | 358/1.13 |

* cited by examiner

*Primary Examiner* — Gabriel Garcia
(74) *Attorney, Agent, or Firm* — Pearne & Gordon LLP

(57) ABSTRACT

A multi-media print includes a decoding module, a configuration memory, and a parameter determination module. The decoding module decodes print job parameters and print job data, and outputs decoded print job parameters including decoded print job media selection parameters and the decoded print job data. The configuration memory stores default configuration parameters. The parameter determination module receives the decoded print job parameters including the decoded print job media selection parameters and the decoded print job data and also receives the default configuration parameters including the default media selection parameters from the configuration memory. The parameter determination module determines the final print job media selection parameters for the print job, utilizing the decoded print job media selection parameters and the default media selection parameters. The default media selection parameters are utilized when the print job parameters and print job data are not sufficient to select the media.

22 Claims, 5 Drawing Sheets

DEFAULT MEDIA SELECTION METHODS IN A MULTI-MEDIA PRINTER

RELATED APPLICATIONS

This application is a continuation of U.S. application Ser. No. 10/719,745, now U.S. Pat. No. 8,031,347, which claims the benefit of U.S. provisional patent application Ser. No. 60/428,418, filed Nov. 22, 2002, incorporated herein by reference in their entirety.

BACKGROUND OF THE INVENTION

Health care organizations, such as hospitals, clinics, and offices, have computer networks which allow the transfer of digital medical images from one location to another. An exemplary medical imaging network may include a Picture Archive and Communication System (PACS) device, a Computed Radiography (CR) device, an Ultrasound device, a Computed Tomography (CT) device, a Magnetic Resonance Imaging (MRI) device, a Nuclear Medicine (NM) device, a Digital Radiography (DR) device, a mammography device, an angiography device, a Positron Emission Tomography (PET) scanning device, or other digital imaging devices. This list of medical imaging devices is merely illustrative and not exhaustive. Also installed on the medical imaging network is a multi-media printer which produces or creates print jobs generated by a print client on the medical imaging devices. The multi-media printer allows printing on film-based media along with printing on paper media. Medical professionals, in many cases, are familiar with a wet-film process where an image is exposed on film and the film is processed to provide a display. Therefore, the multi-media printers produce images which have a similar appearance and function to the images produced by the wet-film process.

The multi-media printer may include a combination of printing technologies. The printing technologies include, laser-toner, laser-photothermographic, ink-jet, direct thermal, or dye-diffusion printing technologies. This list is merely illustrative and not exhaustive. In direct thermal printing, media, having a thermal responsive surface, is brought into contact with the printhead and translated over the printhead. When the media is translated over the printhead, thermal elements on a linear array are selectively heated to transfer pixels to the media which correspond to pixels in the desired image. In the dye-diffusion process, a donor ribbon and receiver media are translated together over the printhead, the donor ribbon being between the printhead and the receiver media. While the donor ribbon and receiver media are translated over the printhead, the individual thermal elements on the linear array are selectively heated to transfer dye from the donor ribbon to the receiver media to form pixels corresponding to pixels in a desired image.

Multi-media printers are capable of printing on a variety of media types, e.g., paper and film, and also on a variety of media sizes, e.g., A-size, A4-size, 8×10 inch, 10×14 inch, 11×14 inch, 11×17 inch, and 14×17 inch. Multi-media printers also are capable of supporting color-specific media and grayscale-specific media of a given type, i.e., color paper and grayscale paper. The plurality of options available for each incoming print job requires a method to be established within the multi-media printer for selecting a specific media for each incoming print job. Typically, when dye-diffusion printing technologies are utilized, the multi-media printer is capable of printing on media sizes A and A4. If direct thermal print technologies are utilized, the multi-media printer is capable of printing on all of the above-mentioned media sizes.

Traditionally, media-type and/or media size attributes are specified in parameters included within a print job. A print job is transmitted to the multi-media printer utilizing a communication mechanism. The communication mechanism includes a physical layer, an optional transport layer, and an optional application layer. The physical layer protocols may include, but are not limited to, Ethernet, Token Ring, Universal Serial Bus, Parallel (Centronics, etc.), Fiber Optic, and Wireless technologies (802.11 and other WiFi technologies). The transport layer protocols may include, but are not limited to, TCP/IP, AppleTalk™, and raw binary. The application layer protocols include, but are not limited to, FTP, LPR, Printer Access Protocol (PAP), DICOM, and SMB, which is a Microsoft Windows™ network protocol.

The print job may be comprised of PostScript commands and data. Alternatively, the print job may include DICOM Information Object Descriptions (IODs) and data. Alternatively, the print job may just include image data in various file formats such as TIFF, GIF, JPEG, PNG, etc. In another alternative, the print job may include EP Raster commands and data, a format established by Codonics, Inc., of Middleburg Heights, Ohio. In another alternative, a print job includes VMF/FMF control commands, also a format established by Codonics.

The print job includes job parameters, sheet parameters, and image parameters. These parameters specify how the print job is to be printed at the multi-media printer. Job parameters may include, but are not limited to, media type, media size, receive tray, and priority. Sheet parameters may include, but are not limited to, background, border fill, captions, coverage, Dmax (maximum optical density), Dmin (minimum optical density), film view, image warnings, and look up tables (LUTs). Image parameters may include, but are not limited to, antialias, contrast enhancement, gamma correction, medical color management, polarity, rotate, saturation, and scaling.

For example, a print job utilizing the PostScript protocol may include a job parameter known as "Paper Size" to indicate the media size for the print job, and another job parameter known as "Paper Source" to indirectly indicate the media type. Illustratively, a print job transmitted utilizing the Digital Imaging and Communications in Medicine (DICOM) print protocol may include a print job parameter known as "Film Size ID", indicating the media size for the submitted print job, and another print job parameter known as "Medium Type" indicating the media type for the submitted print job.

A print client is the device that submits the print job to the multi-media printer. The print client may be resident within a medical imaging device or a computing device. The multi-media printer has a plurality of media size and media type values available to be utilized in creating images or prints based on the submitted print jobs. Under certain operating conditions, the print client may submit print jobs including job parameters, such as media type and media size, that are supported by the multi-media printer. The print client may select these job media selection parameters utilizing menus in a graphical user interface, or alternatively, via parameters in a configuration file located on the medical imaging device or a computing device.

Under other operating conditions, the print client may not have the capability to submit jobs to utilize all of the plurality of media type and media size job parameters. Under other operating conditions, the print client may not submit media type or media size print parameters at all. For example, in the DICOM protocol, "Film Size ID" and "Medium Type" are optional parameters, which the print client may or may not utilize. Other print job submission protocols, such as Line Printer Remote (LPR) or File Transfer Protocol (FTP), do not include media selection parameters at all. Under these operating conditions, the multi-media printer may receive no job parameters for media size and media type or only partial job parameters, i.e., only one of media size and media type job parameters.

In response to these operating conditions, the multi-media printer may reject the print job as being incomplete or in error, meaning that no media is selected by the multi-media printer for the print job. In many cases, this is not a useful result for the print client.

Another alternative in responding to these operating conditions is to default to the currently loaded media. This option is also not desirable because multiple media types or media sizes may be loaded, or the multi-media printer may be out of media. This alternative also requires that the user verify that the proper media is loaded prior to submitting the print job. This can be very inconvenient if a networked multi-media printer is not proximate to the print client system that submitted the print job.

Another alternative in responding to these operating conditions is to utilize a non-programmable pre-configured default that is used when the previously mentioned media selections methods fail. This guarantees that the print job is queued. However, the submitting print client has no method for selecting or changing the default media setting. In addition, the networked imaging system may not allow the altering or changing of the media selections at all or may require altering the media selections through the use of a diagnostic function or an administrative function to which the user may not have access. Both of these options make it impossible, or at least inconvenient, for the print client user to change or modify the media selection for the submitted print jobs.

Under other operating conditions, the print client, whether it is resident on a computing device or a medical imaging device, may not be allowed to select all of the possible media selection options that are available or configured at the multi-media printer. For example, media sizes A and A4 are generally desktop publishing sizes which medical imaging devices do not normally support. Accordingly, many medical imaging devices may not support the selection of media sizes A and A4 because they typically utilize media with a size of 8×10, 11×14, or 14×17.

Therefore, it may be desirable for a multi-media printer to allow a user, i.e., a print client, to utilize a desired set of media selection parameters even though the computing devices and medical imaging devices on which the print client is resident is not capable of selecting the desired media selection parameters. Therefore, it would be useful to allow the print client to utilize a desired set of media selection parameters even though the print client is not capable of selecting the desired media selection parameters.

DETAILED DESCRIPTION OF THE DRAWINGS

DETAILED DESCRIPTION

Figure 1:
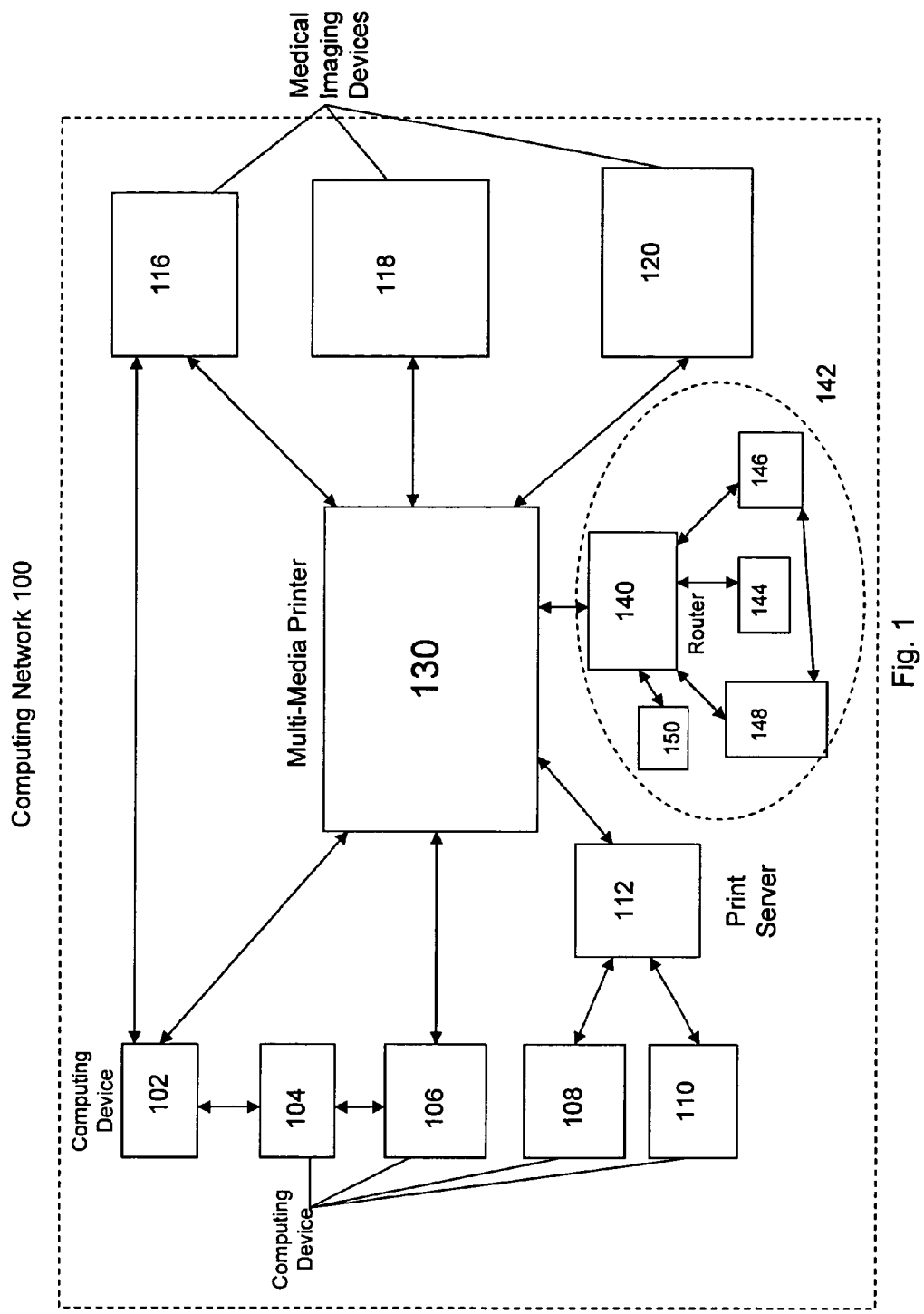
FIG. 1 illustrates transmission paths in a computing network from computing devices and medical imaging devices to a multi-media printer according to an embodiment of the present invention.

FIG. 1 illustrates transmission paths in a computing network from computing devices and medical imaging devices to a multi-media printer according to an embodiment of the present invention. A computing network 100 may include a plurality of computing devices 102, 104, 106, 108, and 110, a plurality of medical imaging devices 116, 118, and 120, and at least one multi-media printer 130. The computing network may include a plurality of multi-media printers but for simplicity only one multi-media printer 130 is illustrated. The computing network 100 may also include a router 140 which connects a subnetwork 142 to the computing network 100. The subnetwork 142 may include a plurality of computing devices 144 and 146 and a plurality of medical imaging devices 148 and 150. The computing network may be a local area network, a wide area network, or the computing devices and medical imaging devices may be coupled to the multi-media printer 130 via a global communications network, e.g., the Internet. The communication network 100 may be transmitting data according to a variety of communication protocols. Illustratively, the communication protocols may include FTP, LPR, PAP, DICOM, or SMB.

The multi-media printer 130 prints graphic images or text documents transmitted from the plurality of computing devices 102, 104, 106, 108, and 110. In one embodiment of the invention, the graphic images or text documents may be first transmitted to another computing device, e.g., from computing device 104 to 102 and then to the multi-media imager 130. In another embodiment of the present invention, the graphics images or text documents may be first transmitted to a print server 112 which then transmits the documents to the multi-media imager 130. The multi-media printer 130 prints medical images transmitted from the plurality of medical imaging devices 116, 118, and 120.

In an embodiment of the invention, a PACs workstation may receive graphic images or text documents from multiple medical imaging and computing devices and may then transmit the graphics images or text documents to the multi-media printer 130. In an embodiment of the invention, the PACS workstation or a device functioning in a similar fashion to the PACS workstation may poll the medical imaging devices to determine if any graphics images or text documents need to be transmitted to the multi-media printer 130. In an additional embodiment of the invention, a print job submitted from print client A may require images to be retrieved from another medical imaging device, e.g., a file or database server or an MRI. In this embodiment of the invention, the multi-media printer 130 may receive the print job from the print client A and send a request to the other medical imaging device (housing the necessary images) in order to print the graphic images and text documents. This may be referred to as "pulled print" or "pulling images."

In an embodiment of the invention, the multi-media printer 130 may support printing requests from a plurality of medical devices 116, 118, and 120 and/or computing devices 102, 104, 106, 108, and 110 utilizing a variety of protocols. The protocols may include the DICOM protocol, the PostScript protocol, the FTP protocol, the LPR protocol, and the PAP.

The medical imaging devices 116, 118 and 120, and the computing devices 102, 104, 106, 108, and 110 transmit print jobs which may include a plurality of print parameters and print job data. The medical imaging devices 116, 118, and 120 may communicate directly with the computing devices 106, 108, and 110. The print job may also be referred to as a print operation. The plurality of print parameters may include job parameters, sheet parameters, and image parameters. The plurality of medical imaging devices 116, 118, and 120 may be a Picture Archive and Communication System (PACS) device, a Computed Radiography (CR) device, an Ultrasound device, a Computed Tomography (CT) device, a Magnetic Resonance Imaging (MRI) device, a Nuclear Medicine (NM) device, a Digital Radiography (DR) device, a mammography device, an angiography device, a PET scanner device, or other digital imaging devices. The medical imaging devices may transmit print jobs utilizing the DICOM protocol.

The plurality of computing devices 102, 104, 106, 108, and 110 may be laptop computers, personal digital assistants, cellular phones, desktop computers, or other devices able to create print jobs.

The multi-media printer 130 may be able to print images on a variety of medias including paper and film. The multi-media printer 130 may also be able to print on a variety of media sizes, e.g., A-size, A4-size, 8×10 inch, 10×14 inch, 11×14 inch, 11×17 inch, and 14×17 inch. Illustratively, the multi-media printer 130 may be able to print on blue film and clear film, such a DirectVista® manufactured by Codonics, Inc. The multi-media printer 130 may be able to print on grayscale paper, such as DirectVista® Grayscale Paper, distributed by Codonics, Inc. The multi-media printer 130 may also be able to print on ChromaVista® Color Paper or Film, distributed by Codonics, Inc.

When the multi-media printer 130 receives a print job from a print client, the multi-media printer 130 utilizes a predetermined sequence of job, sheet, and image parameters sources to determine the final print job parameters, including the final media selection parameters. The multi-media printer 130 may determine if a print client indicator is specified. If the print client indicator is specified, a mapping module is utilized to determine if a matching entry can be located for the print client indicator. In an embodiment of the invention, the matching entry may include a job settings file. If the matching entry includes a job settings file, the multi-media printer 130 determines if the job settings file includes media selection parameters. If the job settings file includes media selection parameters, these media selection parameters are utilized. In an embodiment of the invention, the matching entry may directly include media selection parameters, which are then utilized. In either embodiment discussed above, the media selection parameters are then evaluated to determine if they are defined and operational by the multi-media printer 130. If both of the media selection parameters are not defined and operational by the multi-media printer 130, the multi-media printer 130 may either supplement the selected media selection parameters with the default media selection parameters or may utilize the default media selection parameters (if the combination of the supplement parameter and the selected media selection parameters are not defined and operational).

If the print client indicator is not specified, the multi-media printer 130 may utilize application specified parameters. Illustratively, application specified parameters may include DICOM print session information, standard parameters from a PostScript file, or Horizon parameters in DSC comments from a PostScript file. If the print client indicator is not specified and the application specified parameters do not include the necessary media selection parameters, then default media settings, discussed below, may be utilized to select the media selection parameters which are the final media selection parameters. Default media settings, by definition, are always operational and defined, the multi-media printer ensures that default media settings are always defined and that only operational media parameters are configured.

The multi-media printer 130 may include default parameters, e.g., default job parameters, default sheet parameters, and default image parameters. In the default job parameters, default media selection configurations may be employed for the multi-media printer 130. The default media selection configurations may be stored in a non-volatile configuration memory. The default media selection configurations are not hard-wired and may be modified or changed by a user or, alternatively, by the print client. The default media selection configurations may also be referred to as default media selection parameters. The default media selection parameters may be alterable via a control panel on the multi-media printer 130. The default media selection configurations may be alterable via user instructions from a properly authenticated computing device 102, 104, 106, 108, and 110 or medical imaging device 116, 118 and 120. This allows the alterability of the default media parameters when other media selection methods are insufficient or inapplicable, or when other media selection methods are purposefully disabled. One of the default media selection configurations is normally utilized when any or all other media selection methods fail.

In an embodiment of the invention, a print client may force a default media selection configuration at the multi-media printer 130 regardless of the media type and media size selected utilizing other media selection methods. For example, a software application operating on a medical imaging device may allow the selection of the A or A4 size media. The submitted print job from the print client may include a code or phrase, e.g., a text attribute, that allows the multi-media printer to utilize a configured default media selection parameter, e.g., 11×14 media size. Thus, even though an application parameter in the plurality of print parameters may indicate that the A or A4 size is selected, the code or phrase overrides this selection and selects the corresponding default media selection parameter.

Under other operating conditions, a flag or indicator may be set for the multi-media printer 130 indicating that an "always use default" condition has been established. The "always use default" condition may also be referred to as an overriding default media selection parameter. The establishment of the "always use default" in the multi-media printer 130 overrides all other media selection methods, e.g., media selection within the print job or from a code or phrase. Illustratively, this means that if the print job specifies a media type selection as Grayscale paper and a media size selection as A4 and the multi-media printer's 130 default media selection configuration requires a media type selection as color paper and a media size selection of A, then the print job's media selection parameters will be the media type of color paper and the media size of A (assuming the "always use default" is activated or selected).

Under certain operating conditions, partially specified media selection information, from a client device such as computing devices 102, 104, 106, 108, and 110 or the medical imaging devices 116, 118, and 120, may be combined with the default media selection parameters from the multi-media printer 130. Illustratively, a client device on the network may be able to transmit a print job that can control certain media selection parameters of the multi-media printer 130, but cannot control other media selection parameters of the multi-media printer 130. Under these operating conditions, the multi-media printer 130 may honor the partially specified or partially sufficient media selection parameters transmitted in the print job and also supply the default media selection parameters for the other media selection parameters of the print job that the client device did not or was not able to supply. Illustratively, the client device may submit a media size media selection parameter of 14×17 and the default media selection parameters are media size of 8×10 and media type of film. The multi-media printer 130 may supplement the media size media selection parameter of 14×17 with the default media type of film to produce final media selection parameters of film media type and 14×17 media size.

Figure 2:
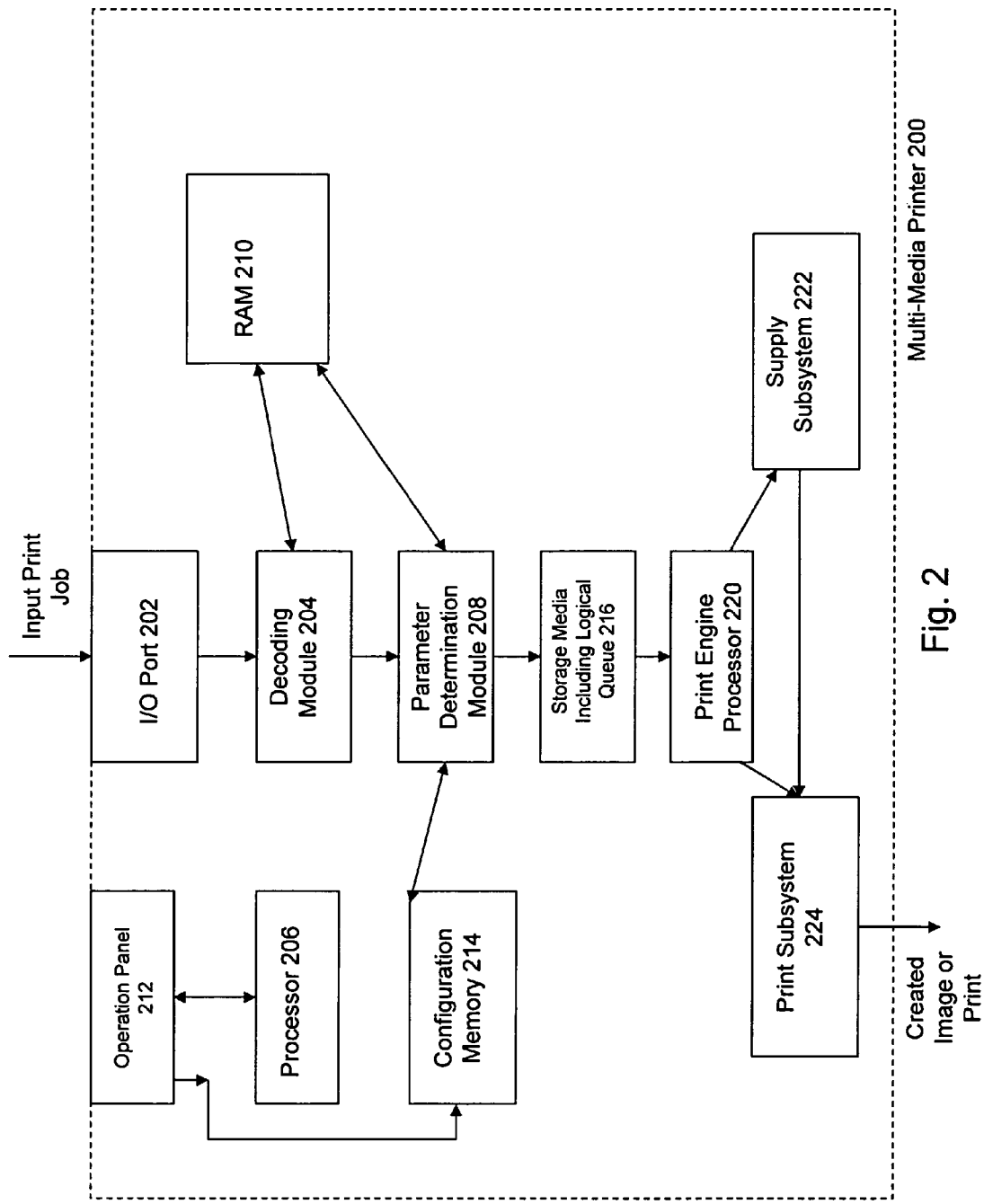
FIG. 2 illustrates a multi-media imager utilizing default media selection parameters according to an embodiment of the present invention.

FIG. 2 illustrates a multi-media printer utilizing default media selection parameters according to an embodiment of the present invention. The multi-media printer 200 may include an input/output port 202, a decoding module 204, a parameter determination module 208, a processor 206, a random access memory 210, an operation panel 212, a configuration memory 214, and a non-volatile storage device 216 including a logical queue. The multi-media printer 200 may also include a print engine processor 220, a supply subsystem 222, and a print subsystem 224.

The input/output port 202 receives a print job from a medical imaging device or a computing device via the communications network 100 (see FIG. 1). The input/output port 202 is a digital input/output port. The print job or print operation includes a plurality of print parameters and print job data. The plurality of print parameters may include job parameters, sheet parameters, and image parameters. The job parameters include media selection parameters. The plurality of print parameters may also be referred to as a plurality of print attributes. The media selection parameters may include, but are not limited, to media type parameters and media size parameters. The print job media selection parameters and print job data are transmitted by the medical imaging device 116, 118, or 120 (see FIG. 1) or computing device 102, 104, 106, 108, and 110 (see FIG. 1) according to a communications protocol. Illustratively, the communication protocols may include application layer protocols such as FTP, LPR, PAP, DICOM, or SMB. The communications protocols may include transport layer protocols such as TCP/IP, AppleTalk™, or a raw binary format. The communication medium may include physical layer connections such as Ethernet, Token Ring, USB, parallel communications, fiber optic communications, and wireless communications.

The plurality of print parameters and the print job data are transferred to a decoding module 204. The decoding module 204 may be implemented in software. In an embodiment of the invention, the decoding module 204 may be implemented via a software program that is loaded on a hard disk drive 216, executed by the processor 206, and running in the RAM 210. In this embodiment, the software program may have been stored on a mass storage device, such as a hard disk drive or removable hard disk drive. In an embodiment, the decoding module 204 may be software stored in a read-only memory (ROM), a programmable read-only memory (PROM), an ASIC, an electronically programmable read-only memory (EPROM), or an electronically erasable programmable read-only memory (EEPROM), that is loaded by the processor 206 into RAM. The processor 206 may implement instructions stored in the decoding module 204.

The decoding module 204 receives the plurality of print parameters and the print job data, decodes the plurality of print parameters and the print job data based on the communications protocol, e.g., DICOM, PostScript, etc., and creates a decoded plurality of print parameters and decoded print job data. In an embodiment of the invention, the decoded plurality of print parameters and the decoded print job data may be stored in the RAM 210.

The parameter determination module 208 receives the decoded plurality of print parameters and the decoded print job data. The parameter determination module 208 may receive the decoded print job parameters and the decoded print job data from the RAM 210 or from the decoding module 204. The parameter determination module 208 may be implemented in software loaded into a mass storage device, e.g., a hard disk drive or a removable hard disk drive, where the processor 206 loads the software from the hard disk drive into RAM 210 and executes the software. In alternative embodiments, the software may be stored in a ROM, a PROM, an EPROM, an EEPROM, or an ASIC, as discussed previously. The parameter determination module 208 may utilize the processor 206 to execute instructions resident in the software identified above.

The parameter determination module 208 also receives default configuration parameters including default configuration media selection parameters from a configuration memory 214. The configuration memory 214 may be a volatile memory or may be a non-volatile memory. For simplicity, only non-volatile memory will be discussed event though the configuration could be a volatile memory. In an embodiment of the invention, the non-volatile configuration memory 214 may be a smart-card, a memory card, a memory stick, or other removable memory media. The non-volatile configuration may be a mass storage media like a hard disk, an optical disk, a ZIP disk. The non-volatile configuration memory 214 may store the default configuration parameters including the default media selection parameters for the multi-media printer 130 (see FIG. 1). In an embodiment of the invention, the non-volatile configuration memory 214 may store a single default media selection setting. In an embodiment of the invention, the non-volatile configuration memory 214 may store a plurality of default media selection settings.

In an embodiment of the invention, the non-volatile configuration memory 214 may store a default media selection setting for color jobs and a default media selection setting for grayscale jobs. In an embodiment of the invention, the non-volatile configuration memory may store a default media selection setting that is based on the number of images contained on a single media sheet, e.g., jobs with six images or less are printed on an 8×10 inch media sheet and jobs with greater than six images are printed on 14×17 inch media sheet. In an embodiment of the invention, the non-volatile configuration memory 214 may store a default setting based on the size of the image specified by the print job, e.g., determined from the image parameters of the print job. For example, print jobs with images having a size of 1024 pixels by 1024 pixels or less are printed on A-size grayscale paper and jobs with images of greater size than 1024 by 1024 are printed on 14×17 inch paper. In an embodiment of the invention, the non-volatile configuration memory 214 may store a modality-based default setting. For example, if the print job is submitted from an ultrasound digital imaging device and the print job utilized default media selection parameters, then the media selection is color paper and if the print job utilizes defaults and is submitted from an MRI medical imaging device, the media selection is 14×17 film.

The non-volatile configuration memory 214 may also include an "always use defaults" setting. The non-volatile configuration memory 214 may also include an "always use defaults" flag. A flag or a similar mechanism may be activated or set to indicate that the default media selection parameters are to be utilized. The "always use defaults" setting may also be stored on a mass storage device or a removable mass storage device. The "always use defaults" setting or flag may be set for a specific print job(s) at the control panel of the multi-media printer 130. The "always use defaults" setting or flag may also be established by the print client. In other words, the print client may issue a command to force the multi-media printer 130 to utilize the default media selection parameters regardless of what the job media selection parameters or other parameters state. This may be referred to as the print client forcing a selection.

The non-volatile configuration memory 214 may be protected from unauthorized access. Protection methods may include physical locking mechanisms, electrical locking mechanisms, or software locking mechanisms. The non-volatile configuration memory 214 may be updated with new default configuration parameters including default media selection parameters from the operation panel 212. Alternatively, the non-volatile configuration memory 214 may be updated via a computing device 102, 104, 106, 108, and 110 or a medical imaging device 116, 118, and 120 over the network. If a computing device or medical imaging device updates the non-volatile configuration memory 214, configuration data may pass through the I/O port 202 to the decoding module 204, through the processor 206, and to the non-volatile configuration memory 214. Alternatively, the processor 206 may be bypassed with the configuration data transmitted through the RAM 210 to the non-volatile configuration memory 214 (not shown).

The parameter determination module 208 receives the decoded plurality of print parameters and the decoded print job data. The decoded plurality of print parameters includes the decoded job parameters, sheet parameters, and image parameters. The decoded job parameters include the decoded media selection parameters. The parameter determination module utilizes the decoded media selection parameters and the default media selection parameters from the configuration memory 214 to determine the final media selection parameters for the print job.

Under certain operating conditions, after the plurality of print parameters and print data is received, the parameter determination module 208 determines if the "always use default" setting has been set or activated. If the "always use default" setting has been set, established or activated, the parameter determination module 208 outputs the default media selection parameters as the final media selection parameters for the print job. Illustratively, assuming the default media selection parameters are set to 1) jobs with six images or less are printed on 8×10 inch blue-based medical film or 2) jobs with greater than six images are printed on 14×17 blue-based medical film and the "always use default" flag or setting is activated, if decoded sheet parameters identify that eight images are to be printed on a single sheet as part of the print job, then the parameter determination module 208 establishes the default media selection parameters as the final media selection parameters, i.e., this print job should be printed on 14×17 blue-based medical film. As mentioned previously, the "always use default" flag can be activated at the multi-media printer or alternatively can be set by the print client. The print client can issue a command or code prior to the transmission of the print job or integrated with the print job that establishes that the "always use default" flag is activated.

Under other operating conditions, the decoded media selection parameters may not specify a media-type parameter and a media-size parameter. Similarly, the decoded media selection parameters may not specify operable and sufficient media-type and media-size parameters. The parameter determination module 208 may analyze the decoded media selection parameters and determine that no media-type and media-size parameter is included in the decoded job parameters of the print job. In this case, the parameter determination module 208 utilizes the default printer media selection parameters and transmits the default printer media selection parameters as the final media selection parameters.

The parameter determination module 208 may analyze the decoded print job media selection parameters and determine that the media type or media size parameters are insufficient or inoperable, i.e., they are not operational. Not operational may signify, for example, that the media type and media size parameters are not supported by the multi-media printer 200, that the parameters are not specified properly, or that the media selection parameters selected point to a media input that is empty. In this case, the parameter determination module 208 utilizes the default printer media selection parameters and transmits the default printer media selection parameters as the final print job media selection parameters for the media size and the media type.

Under certain operating conditions, the decoded media selection parameters may include only partial media selection criteria. The decoded media selection parameters may only include one of a media type or media size parameter. Illustratively, the print client resident on the computing device or the medical imaging device may only send a parameter that specifies media type and may not transmit a parameter that specifies media size. The parameter determination module 208 receives the decoded media selection parameter as the partial media selection criteria and supplements the partial media selection criteria with the corresponding default media selection parameter.

In addition, under certain operating conditions, the decoded media selection parameters may be specified, but not operational. If the decoded media selection parameters are specified, but not operational, then the default media selection parameters are utilized as the final media selection parameters. For example, the decoded media selection parameters may request that 14 by 17 blue film be utilized. The multi-media printer 200 may only support smaller media sizes. Under these operating conditions, the multi-media printer 200 may utilized the default settings as the final media selection parameters, e.g., A-size blue film.

Illustratively, a print job transmitted utilizing the DICOM protocol and transmitted by a medical imaging device may only send a "media type" print parameter which is decoded by the decoding module 204. The parameter determination module 208 receives the decoded "media type" print job parameter from the decoding module 204, identifies that there is no "media size" media selection parameter, and determines the corresponding default "media size" media selection parameter to pair with the supplied "media type" media selection parameter. The parameter determination module 208 transmits as the final print media selection parameters the decoded "media type" media selection parameter and the default "media size" media selection parameter.

Under certain operating conditions where the decoded media selection parameters may include only partial media selection criteria and the parameter determination module 208 supplements the decoded media selection parameter with a default media selection parameter, the combination of the decoded media selection parameter with the default media selection parameters may not be operational with the multi-media printer 130. Under these operational conditions, the default media selection parameters, e.g., media type and media size, may be utilized as the final media selection parameters. In other words, the parameter determination module 208 utilizes the default media selection parameters for the submitted print job.

The default media selection parameters may be utilized if other methods of assigning media selection parameters fail or cannot be utilized. For example, one method of assigning or selecting media selection parameters is the use of print client indicators such as a modality indicator, a network identity, a TCP port number, or a free-form text attribute. Illustratively, the print client indicator may be sent along with plurality of print parameters in a print job by a medical imaging device or a computing device. These print client indicators may be pre-defined on the multi-media printer 130. Alternatively, they may be user configurable at the multi-media printer 130. In one embodiment, the print client indicators may specify a media type or media size explicitly. Alternatively, the print client indicators may specify a job settings file, which may or may not include media selection parameters. Further discussion of the print client indicators is provided in the following patent application, the disclosure of which is incorporated herein by reference: application Ser. No. 10/719,871, entitled "Media Selection Method In a Multi-Media Printer Utilizing Print Client Indicators," filed concurrently herewith.

The default media selection parameters may also be utilized in conjunction with a sheet parameter, such as the coverage parameter. The coverage parameter or attribute may allow the print job to specify the particular area of the sheet to be used for rendering the print data of the print job. The coverage parameter or attribute may be included in the default parameters. Illustratively, the print job parameters may include standard coverage (print with ¼" or 1" margins) or "full-bleed" coverage mode (print on entire physical sheet). Further discussion of the print sheet coverage parameter or attribute is provided in the following patent application, the disclosure of which is incorporated herein by reference: application Ser. No. 10/719,871, entitled "Media Selection Method In a Multi-Media Printer Utilizing Print Client Indicators," filed concurrently herewith.

Figure 3:
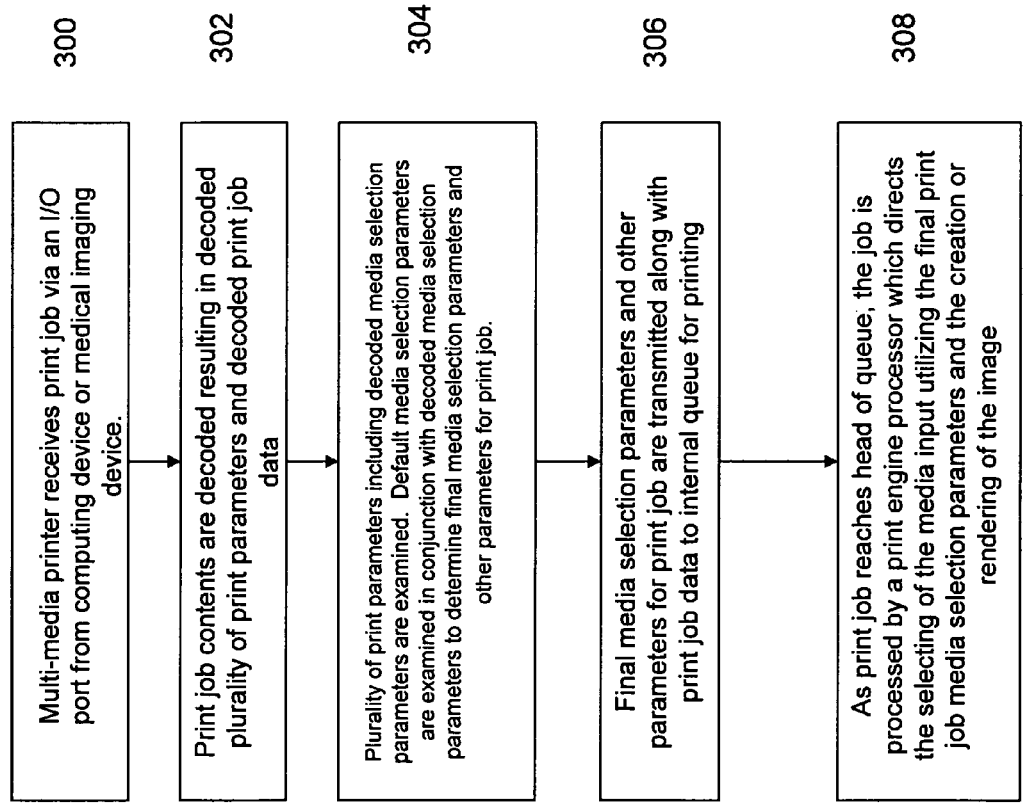
FIG. 3 illustrates a method of selecting and transmitting final media selection parameters utilizing default media parameters according to an embodiment of the present invention.

FIG. 3 illustrates a method of selecting and transmitting final media selection parameters utilizing default media selection parameters according to an embodiment of the present invention. A multi-media printer receives 300 a print job via an input/output port. The multi-media printer may receive the print job from a computing device or a medical imaging device located on the same computing network 100 (see FIG. 1) as the multi-media printer 200 (see FIG. 2).

The print job contents may be decoded 302 resulting in a decoded plurality of print parameters and decoded print job data. The decoded plurality of print job parameters includes decoded job parameters, decoded sheet parameters, and decoded image parameters. The decoded job parameters include decoded media selection parameters. The print job contents may be decoded utilizing any application layer or transport layer decoders. For example, the print job contents may be decoded utilizing a DICOM decoder, a Postscript decoder, a USB decoder, a parallel port decoder, an FTP decoder, a LPR decoder, or email protocol decoders. This list is illustrative of many potential decoders and is not exhaustive.

The decoded plurality of print parameters are examined 304. The decoded media selection parameters are examined to determine media size and media type. Default configuration parameters including default media selection parameters that may be stored on a smart card device or other non-volatile storage device are also examined along with the decoded media selection parameters.

After the print job parameters are finalized, the final print job parameters including the final media selection parameters and the decoded print job data are transmitted 306 to an internal queue. The final print job parameters including the final media selection parameters and the print job data reside in the queue. In an embodiment of the invention, one the final print job parameters, including the media selection parameters, are in a queue, the final print job parameters may not be modified. You can reconfigure the multi-media printer, for example, with new default media selection parameters, but the reconfiguration may only affect newly submitted print jobs and not queued print jobs. The queue may be a FIFO queue or alternatively a queue with different priority schemes. The print job parameters may also include a parameter that specifies a priority of the print job. If the print job includes a final print parameter with a high or medium priority parameter, the print job may be pushed to a higher position, i.e., closer to being processed, within the queue. In some embodiments of the invention, the queue may reside on a non-volatile storage medium, such as a hard disk or a removable disk drive.

When the final print job parameters including the final media selection parameters and the print job data reach the head of the queue, the final print job parameters including the final media selection parameters and print job data are transmitted 308 to the print engine processor. The print engine processor 220 (see FIG. 2) receives the final print job parameters including the final media selection parameters and transmits instructions to the media supply subsystem 222 (see FIG. 2) in order to select the media supply. The print engine processor 220 also transmits instructions to the printing subsystem 224, either the direct thermal printing system or the dye-diffusion printing system, to produce or render an image corresponding to the print data in accordance with the final print job parameters.

Figure 4:
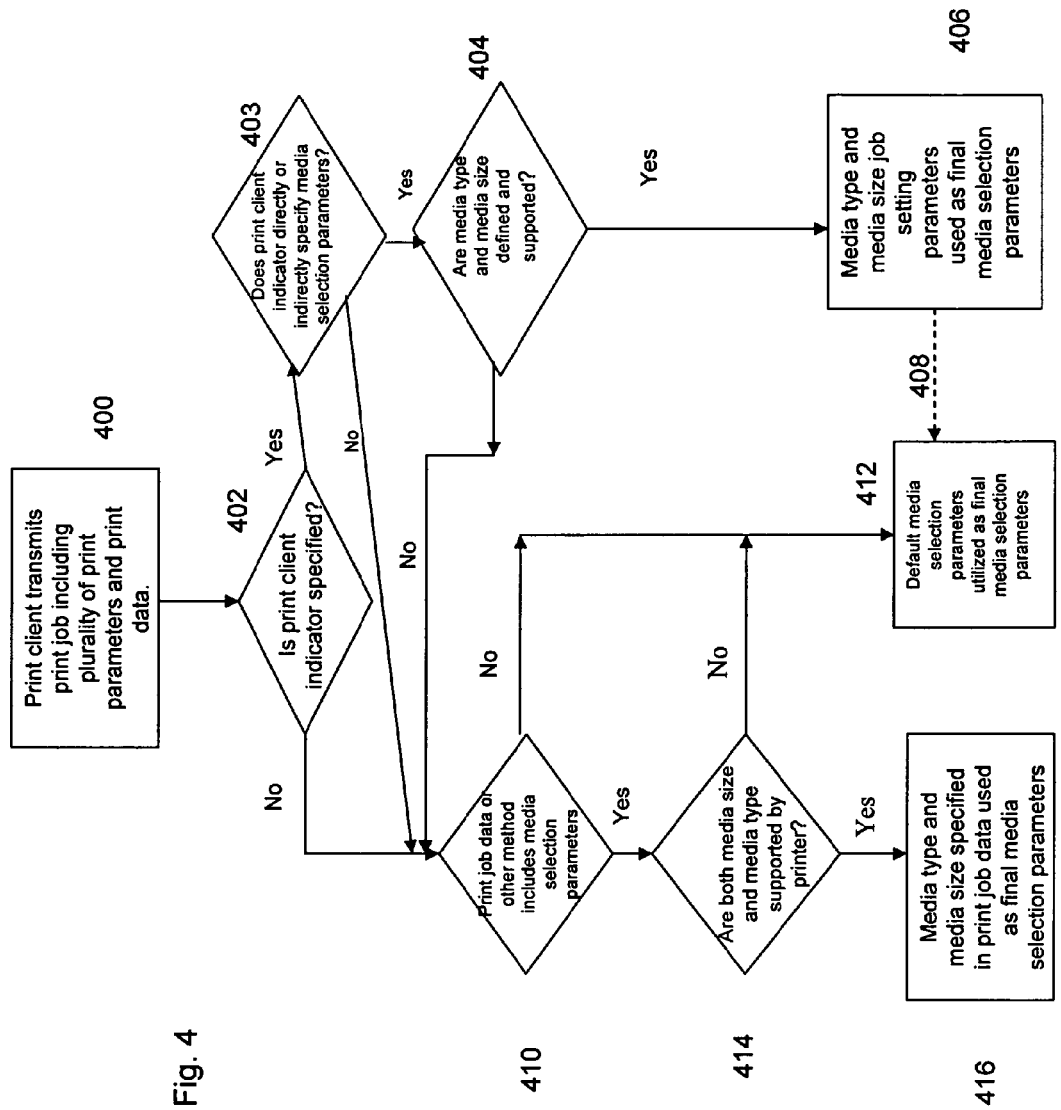
FIG. 4 illustrates a method of selecting final media selection parameters utilizing default media parameters according to an embodiment of the present invention.

FIG. 4 illustrates a method of selecting final media selection parameters utilizing default media selection parameters according to an embodiment of the present invention. The print client transmits 400 a print job including a plurality of print parameters and print data. The multi-media printer determines 402 if a print client indicator is specified. If a print client indicator is specified, the multi-media printer 403 determines if the print client indicator directly or indirectly specifies media selection parameters. If the print client indicator directly or indirectly specifies media selection parameters, the multi-media printer identifies 404 if the media type and media size media selection parameters are supported. If the media type and media size media selection parameters are supported by the multi-media printer, the media type and the media size parameters are selected 406 as the final media selection parameters.

The user may also force the use of the default media selection parameters. As illustrated by the dotted line 408, the job settings file may include a command or code that identifies that the default media selection parameters should be utilized for the multi-media printer regardless of whether the media type and media size are defined in a job settings file and are supported by the multi-media printer. Therefore, even if 1) the print client indicator is specified or utilized, 2) the print client indicator directly or indirectly species media selection parameters; and 3) the media type and the media size are supported by the multi-media printer, the default media selection parameters are selected because of the presence of the command or code.

If the print client indicator is not specified, if the print client indicator does not directly or indirectly specify media selection parameters, or if one of the specified media selection parameters is defined and operational, but one of the media type or size is not supported by the multi-media printer, then the multi-media printer may determine 410 if the applications print job data includes decoded media size or media type parameters or if decoded media size or media type parameters are defined by any other means. If the applications print job data or any other means does not include the decoded media size or media type, the multi-media printer may utilize 412 the default media selection parameters as the final media selection parameters.

If the application's print job data or any other method of providing the media selection parameters does include the decoded media size parameter and media type parameter, then the multi-media printer verifies 414 that the media type and the media size can be supported by the multi-media printer. If the multi-media printer does not support both of the media type and media size identified in either the decoded media selection parameters, the multi-media printer utilizes 412 the default media selection parameters. If the multi-media printer supports one of the decoded media selection parameters, then the multi-media printer utilizes the supported media selection parameter and supplements this by using a default media selection parameter for the unsupported media selection parameter. In other words, if the decoded media selection parameters or other means select a media size, e.g., 9×12, that is not supported by the printer but select color film that is supported by the multi-media printer, the default media size parameter from the default media selection parameters may be utilized to supplement the selected and operational media selection parameter.

As discussed above, the multi-media printer may have one of the media selection parameters defined in the print job data or via another selection method. The multi-media printer may utilize the default media selection parameter to supplement the decoded media selection parameter. However, after the decoded media selection parameter and the default media selection parameter are combined, the multi-media printer may determine that the combination of the multi-media printer and the default media selection parameter are not supported by or not operational with the multi-media printer. Under operating conditions such as this, the multi-media printer may utilize the default media selection parameters as the final media selection parameters for the submitted print job, as utilized in step 306 of FIG. 3 (final media selection parameters and other parameters transmitted to queue).

If the multi-media printer supports both of the media size and media type parameters identified from the decoded media size and media type parameters, then the multi-media printer utilizes 416 the selected media size and media type parameters as the final media selection print parameters for the submitted print job.

Figure 5:
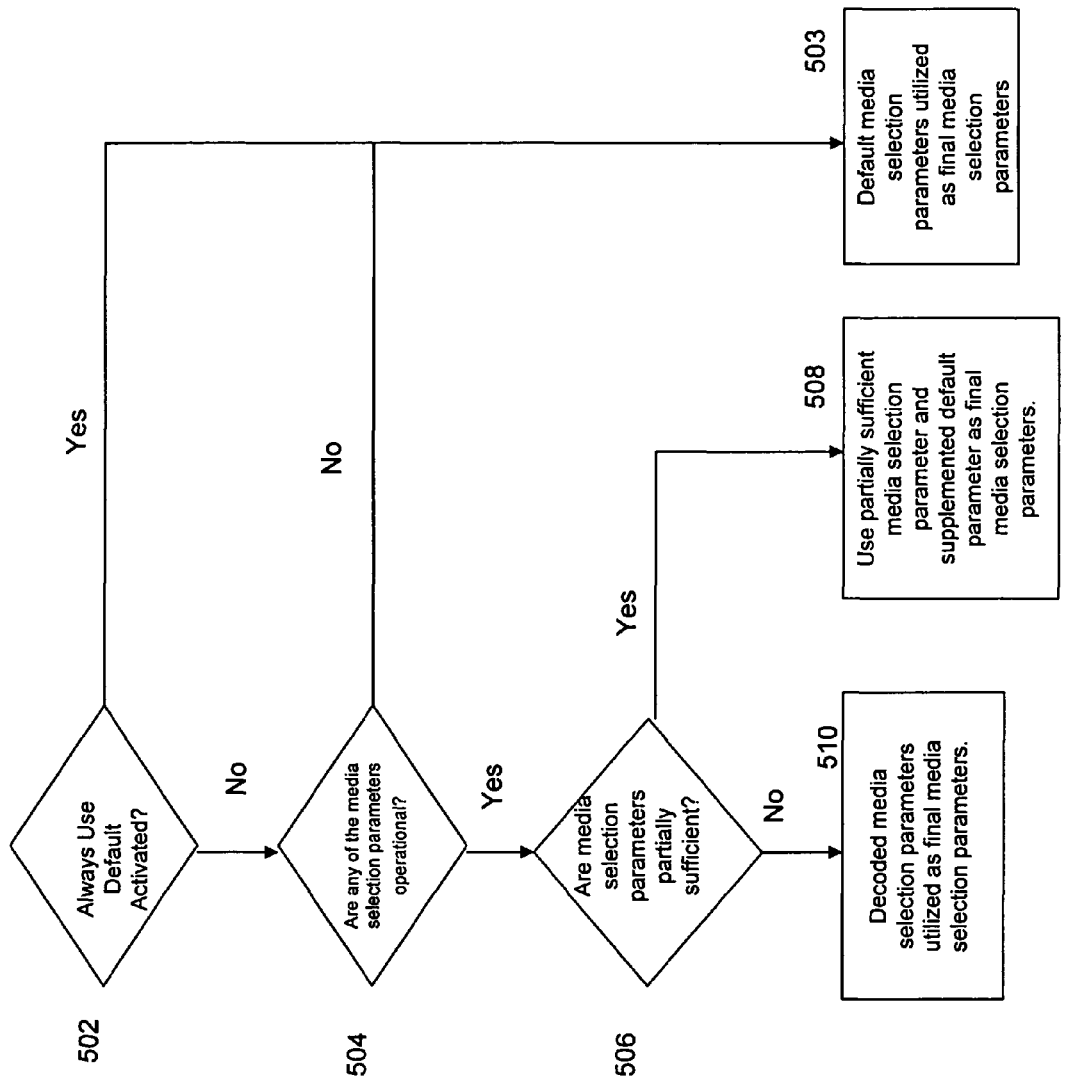
FIG. 5 illustrates a second flowchart identifying a process used by a multi-media printer for selecting final media selection parameters according to an embodiment of the present invention.

FIG. 5 illustrates a second flowchart identifying an alternative process used by a multi-media printer for selecting the final media selection parameters.

After the plurality of print parameters along with the print job data are decoded, the default media selection attributes are examined 502 to determine if the "always use default" parameters indicator has been selected or activated. If the "always use default" parameter is selected, then the default media selection parameters are utilized 503 as the final print job media selection parameters for the print job. Under certain operating conditions, the "always use default" parameter may be selected by the computing device or medical imaging device transmitting the print job. Under other operating conditions, the "always use default" parameter may be selected via the control panel of the printer or due to certain operating conditions of the printer (e.g., certain media are not available, etc.) Under certain operating conditions, a single default media selection parameter may be utilized for the print job or a plurality of default media selection parameters may be utilized for the print job.

If the "always use default" parameter has not been selected, activated, or established, then the decoded media selection parameters are examined 504 to determine if the decoded media selection parameters are operational with the multi-media printer 200 or if they are sufficient for use by the multi-media printer 200. Illustratively, the decoded media selection parameters are analyzed to determine if they are supported by the multi-media printer 200, if the media selection parameters are submitted in the correct format, or if the media selection parameters are sufficient for the multi-media printer 200. If the decoded media selection parameters are not operational or are not sufficient, then the printer default media selection parameters are utilized 503. The decoded media selection parameters may not be operational because the decoded media selection parameters may be media selection parameters that are supported by the multi-media printer 200, but the media selected is not present in the multi-media printer, e.g., the media input is empty. As described above, the printer default parameters may include a plurality of different options.

If the decoded media selection parameters are operational and at least partially sufficient, then the decoded media selection parameters are analyzed 506 to determine what portion of the decoded media selection parameters are sufficient or operational. For example, in some print client systems, the user or software application may control the selection of media type, but it may not allow control of the selection of media size. Rather than completely rejecting the print job for the print client system, the multi-media printer 200 may utilize the default media selection parameters to supplement 508 the decoded media selection parameters. In the example noted above, the decoded media selection parameters from the client system select or identify the media type and the printer's default media selection parameters are utilized 508 to supplement the decoded media selection parameters to provide the media size. In an embodiment of the invention, the combination of the decoded media selection parameter and the supplemented default media selection parameter are verified by the multi-media printer to determined if the combination is operational. If the combination of the decoded media selection parameter and the supplemented media selection parameter are not operational, then the default media selection parameters (not shown) are utilized for the submitted print job.

If the decoded media selection parameters are operational, i.e., supported, with the multi-media printer 200, the decoded media selection parameters are utilized 510 as the final media selection parameters.

While the description above refers to particular embodiments of the present invention, it will be understood that many modifications may be made without departing from the spirit thereof The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of configuring a multi-media printer comprising a print engine processor and a print subsystem for printing on a plurality of different media, the method comprising:

using the multi-media printer, receiving a print operation transmitted from a print client device over a communication network, the print operation from the print client device comprising a first media selection parameter to be utilized for selecting a first medium to be used for the print operation; and automatically utilizing default media selection parameters for the print operation if a default media selection override parameter associated with the printer is activated, wherein the default media selection override parameter forces a default media selection configuration at the multi-media printer regardless of the first medium selected based on the first medium selection parameter, and is programmable to be remotely activated in response to receiving an activation command transmitted via the communication network and is to be utilized for selecting a second medium that is different than the first medium to be used for the print operation.

2. The method of claim 1, wherein the activation command to remotely activate the default media selection override parameter is transmitted by the print client device and is included in the print operation received by the multi-media printer.

3. The method of claim 1, wherein the default media selection override parameter is also programmable to be activated locally by a user via an operation panel of the multi-media printer.

4. The method of claim 1, wherein the default media selection override parameter is also programmable via a presence of a configuration memory by the multi-media printer.

5. The method of claim 1, wherein the default media selection parameters include a set of grayscale default settings and a set of color default settings.

6. The method according to claim 1, wherein the default media selection parameters include default settings selected based on a number of images printed on a single sheet as specified in the print operation.

7. The method according to claim 1, wherein the default media selection parameters include default settings selected based on a size of a source image as specified in the print operation.

8. The method according to claim 1, wherein the default media selection parameters are selected based on a modality of the print operation.

9. The method of claim 1, wherein the second medium is an unavailable medium that is not otherwise selectable by the print client device.

10. A method of configuring a multi-media printer comprising a print engine processor and a print subsystem for printing on a plurality of different media, comprising:

using the multi-media printer, receiving a print operation from a print client device, the print operation comprising print job data defining content to be printed during the print operation and media selection parameters defining a first media type and a first media size on which the content is to be printed;

in response to receiving the print operation from the print client device, determining if the media selection parameters received from the print client device, including the first media type and the first media size, indicated in the print operation are operational; and utilizing a default media selection parameter selected from a plurality of potential media selection parameters stored on a computer-readable medium for the print operation if one of the media selection parameters included in the print operation is not operational, wherein the default media selection parameter is programmable, and selected from among the plurality of potential media selection parameters based on a transmission by the print client device.

11. The method of claim 10, further including combining an operational media selection parameter with the default media selection parameter and determining if the combining of the operational media selection parameter with the default media selection parameter is supported.

12. The method of claim 10, wherein the potential default media selection parameters include a set of grayscale print operation default settings and a set of color print operation default settings.

13. The method of claim 10, wherein the potential default media selection parameters include a set of default settings selected based on a number of images printed on a single sheet as specified in the print operation.

14. The method of claim 10, wherein the potential default media selection parameters include a set of default settings selected based on a size of a source image as specified in the print operation.

15. The method according to claim 10, wherein the potential default media selection parameters are determined based on a modality of the print client device.

16. A method of configuring a multi-media printer comprising a print engine processor and a print subsystem for printing on a plurality of different media, the method comprising:

receiving a print operation from a print client device at the multi-media printer that utilizes two printing technologies, the print operation comprising print job data and a set of media selection parameters comprising at least one of a media type parameter and a media size parameter identifying a first medium on which the print operation is to be performed;

determining if the set of media selection parameters is operational; and utilizing a set of default media selection parameters to select a second medium that is different than the first medium and is available to the multi-media printer for the print operation if the media type parameter, the media size parameter or both the media type parameter and the media size parameter are not operational, wherein the set of default media selection parameters is programmable based on a transmission by the print client device.

17. The method of claim 16, wherein the set of default media selection parameters is programmable based on a print client indicator transmitted by the print client device and received by the multi-media printer as part of the print operation.

18. The method of claim 16, wherein the set of default media selection parameters is programmable via an operation panel of the multi-media printer.

19. The method of claim 16, wherein the set of default media selection parameters is programmable via a presence of a configuration memory provided to the multi-media printer.

20. The method of claim 16, wherein the set of default media selection parameters includes a set of grayscale default settings and a set of color default settings.

21. The method of claim 16, wherein the set of default media selection parameters includes default settings selected based on a size of a source image as specified in the print operation.

22. The method of claim 16, wherein the second medium is a medium other than a selectable medium that can be expressly selected by the print client device.

* * * * *